(12) United States Patent
Xu et al.

(10) Patent No.: US 6,429,962 B1
(45) Date of Patent: Aug. 6, 2002

(54) DYNAMIC GAIN EQUALIZER FOR OPTICAL AMPLIFIERS

(75) Inventors: Ming Xu, Dallas; Tizhi Huang; Chongchang Mao, both of Plano; Jian-Yu Liu, Garland; Kuang-Yi Wu, Plano; Charles Wong, Richardson, all of TX (US)

(73) Assignee: Chorum Technologies LP, Richardson, TX (US)

( * ) Notice: Subject to any disclaimer, the term of this patent is extended or adjusted under 35 U.S.C. 154(b) by 0 days.

(21) Appl. No.: 09/730,650

(22) Filed: Dec. 5, 2000

(51) Int. Cl.[7] .................. H04B 10/12; G02F 1/1347; G02F 1/13

(52) U.S. Cl. .................. 359/337.1; 359/341.4; 349/74; 349/76; 349/1

(58) Field of Search .................. 359/337.1, 339, 359/358, 359, 337.2; 349/24, 35, 62, 74, 75, 87; 385/24

(56) References Cited

U.S. PATENT DOCUMENTS

| | | | | |
|---|---|---|---|---|
| 5,111,321 A | * | 5/1992 | Patel | 349/128 |
| 5,132,826 A | * | 7/1992 | Johnson et al. | 349/117 |
| 5,243,455 A | * | 9/1993 | Johnson et al. | 349/117 |
| 5,347,378 A | * | 9/1994 | Handschy et al. | 349/102 |
| 5,381,253 A | * | 1/1995 | Sharp et al. | 349/116 |
| 5,436,760 A | * | 7/1995 | Nakabayashi | 359/132 |
| 5,592,327 A | * | 1/1997 | Gabl et al. | 359/348 |
| 5,596,661 A | | 1/1997 | Henry et al. | 385/24 |
| 5,889,900 A | * | 3/1999 | Hallemeier | 359/115 |
| 5,930,441 A | * | 7/1999 | Betts et al. | 385/140 |
| 5,936,768 A | * | 8/1999 | Oguma | 359/484 |
| 5,963,291 A | * | 10/1999 | Wu et al. | 250/225 |
| 5,978,116 A | * | 11/1999 | Wu et al. | 359/115 |

(List continued on next page.)

FOREIGN PATENT DOCUMENTS

| | | | | |
|---|---|---|---|---|
| EP | 0 991 152 | * | 5/2000 | H01S/3/067 |
| JP | 04147114 A | * | 5/1992 | G02F/1/35 |
| WO | WO 96/07114 | * | 3/1996 | G02B/5/28 |
| WO | WO 99/28778 | * | 6/1999 | G02B/26/02 |

OTHER PUBLICATIONS

Inoue, K. et al. "Tunable Gain Equalization Using a Mach–Zhender Optical Filter in Multi–Stage Fiber Amplifiers." IEEE Photonics Tech. Lett. 3: Aug. 8, 1991, pp. 718–720.*

Frisken, S. et al. "Low–Loss Polarisation–independent dynamic gain–equalisation filter." OFCC 2000, Mar. 2000. vol. 2, p. 251–253.*

"twisted nematic phase" Photonics Dictionary, www.photonics.com/dictionary.*

(List continued on next page.)

Primary Examiner—Thomas H. Tarcza
Assistant Examiner—Andrew R. Sommer
(74) Attorney, Agent, or Firm—Baker Botts L.L.P.

(57) ABSTRACT

An optical equalizer for use primarily with an erbium-doped fiber amplifier has an initial polarizer that convert the input beam to a predetermined polarization, followed by a series of dynamically-adjustable sinusoidal filters that provide attenuation as a sinusoidal function of beam wavelength. Each of the sinusoidal filters has a first liquid crystal cell adjustably rotating the polarization of the beam from the preceding polarizer. This is followed by a second optical element that retards the beam as a sinusoidal function of beam wavelength. For example, the second optical element can be a birefringent crystal that provided a fixed degree of retardance to the beam and a second liquid crystal cell that provides a variable degree of retardance, thereby allowing adjustment of the center frequency of the sinusoidal function. Finally, a third liquid crystal cell adjustably rotates the polarization of the beam. A final polarizer provides amplitude control of the beam based on the polarization rotations introduced by the first and third liquid crystal cells. A controller provides control signals to the liquid crystal cells of each sinusoidal filter so that their combined sinusoidal attenuation functions produce a desired equalization curve.

27 Claims, 18 Drawing Sheets

U.S. PATENT DOCUMENTS

| | | | | |
|---|---|---|---|---|
| 5,978,529 A | * | 11/1999 | Taga et al. | 359/333 |
| 5,990,996 A | * | 11/1999 | Sharp | 349/117 |
| 6,005,697 A | * | 12/1999 | Wu et al. | 359/117 |
| 6,034,812 A | * | 3/2000 | Naito | 359/124 |
| 6,130,731 A | * | 10/2000 | Andersson et al. | 349/100 |
| 6,141,130 A | * | 10/2000 | Ip | 359/124 |
| 6,275,328 B1 | * | 8/2001 | Parry et al. | 359/337 |
| 6,321,000 B1 | * | 11/2001 | King | 359/181 |

OTHER PUBLICATIONS

Wu, S.-T. "Liquid Crystals." Handbook of Optics vol II. McGraw-Hill, New York, 1995, pp. 14.1–14.26.*

Hyo Sang Kim et al., "Dynamic gain equalization of erbium–doped fiber amplifier with all–fiber acousto–optic tunable filters", OFC '98 Technical Digest, WG4, pp. 136–138.

S.P. Parry et al., "Dynamic gain equalisation of EDFAs with Fourier filters", Tech. Dig. OAA, 1999, paper ThD 22 (Nortel).

R. A. Betts et al., "Split–beam Fourier filter and its application in a gain–flattened EDFA", OFC '95 Technical Digest, TuP4, pp. 80–81.

* cited by examiner

*Fig. 4*
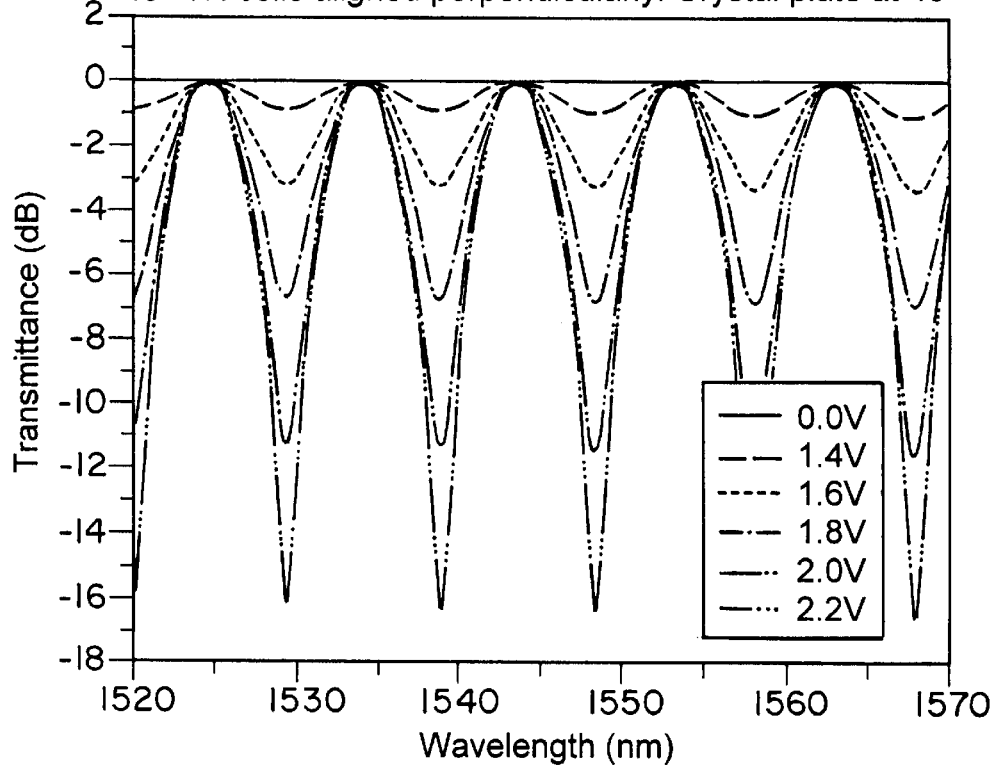
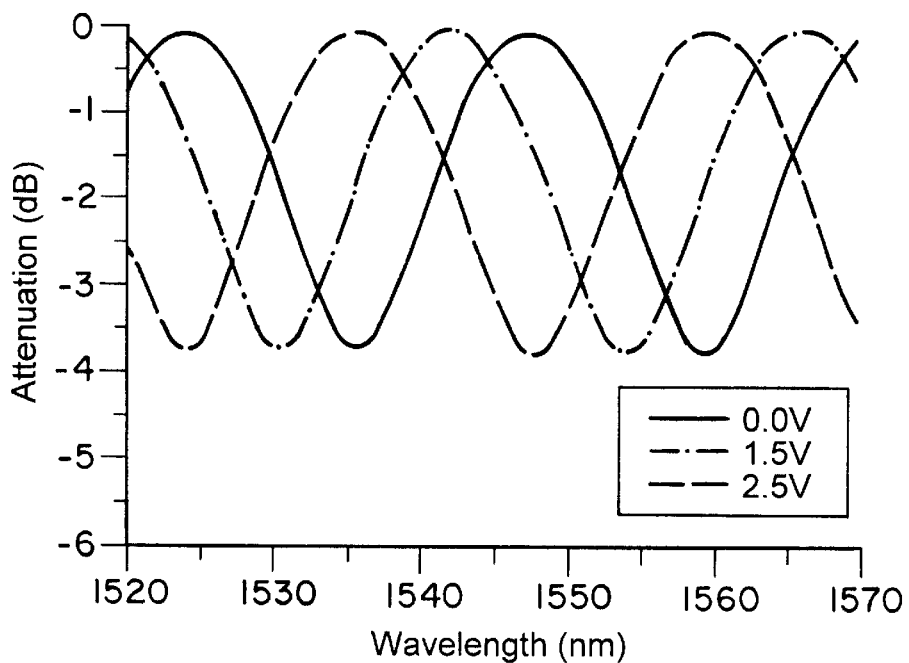
*Fig. 5*

Fig. 12(a)
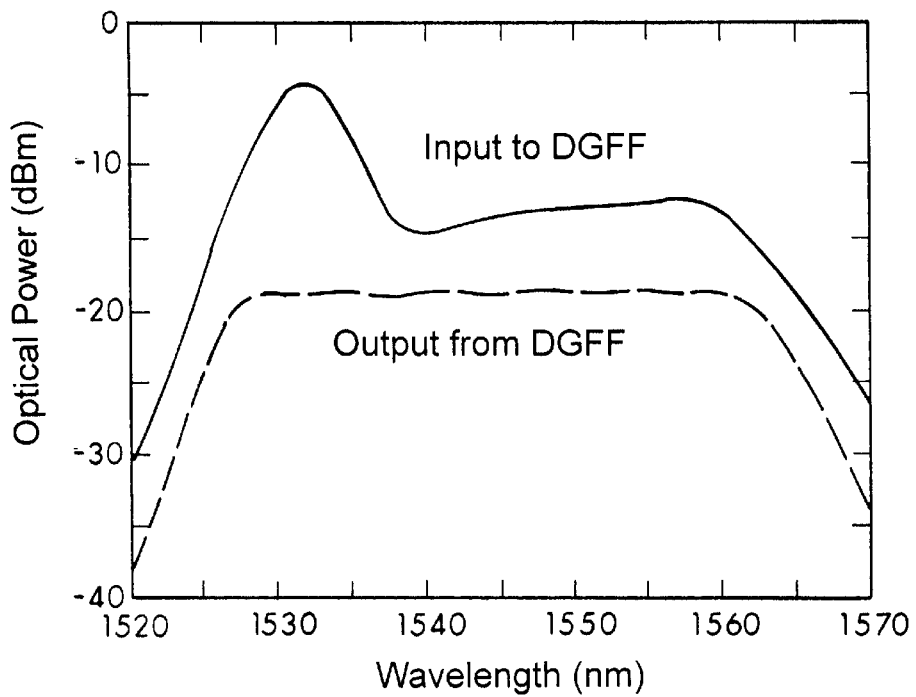
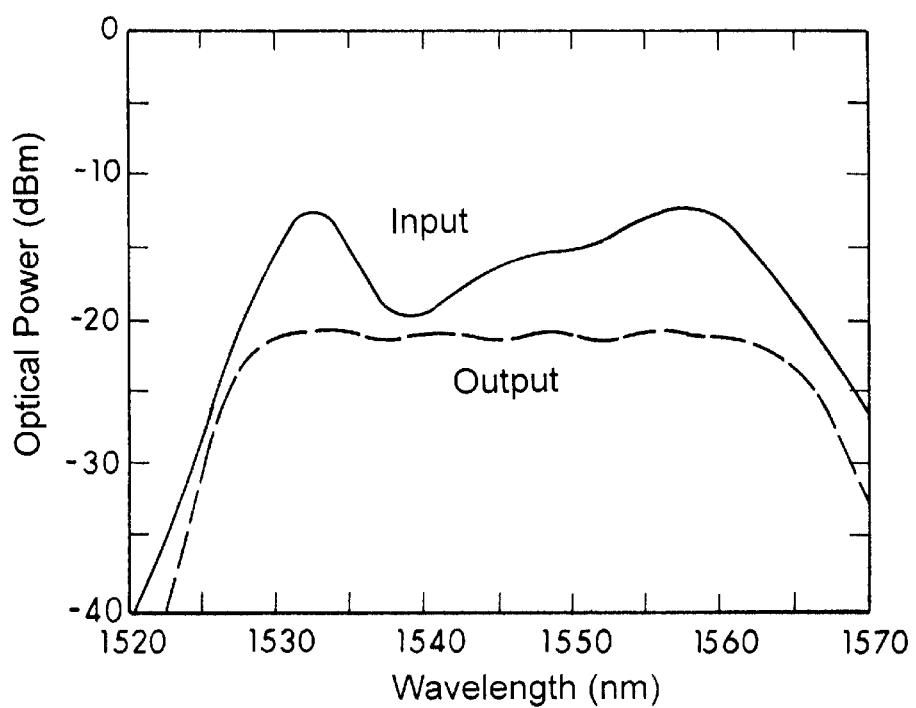
Fig. 12(b)

Fig. 12(c)
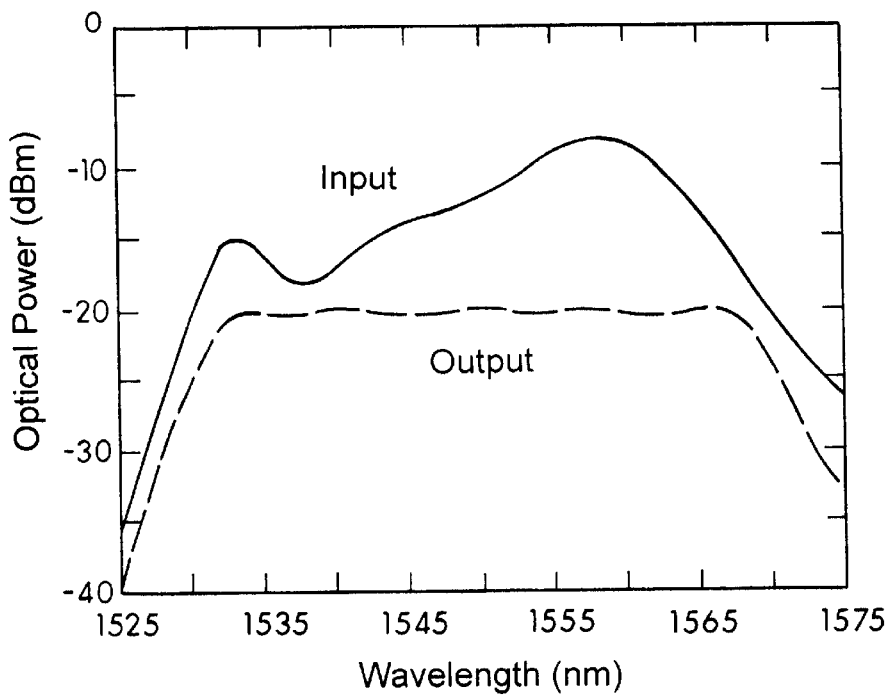
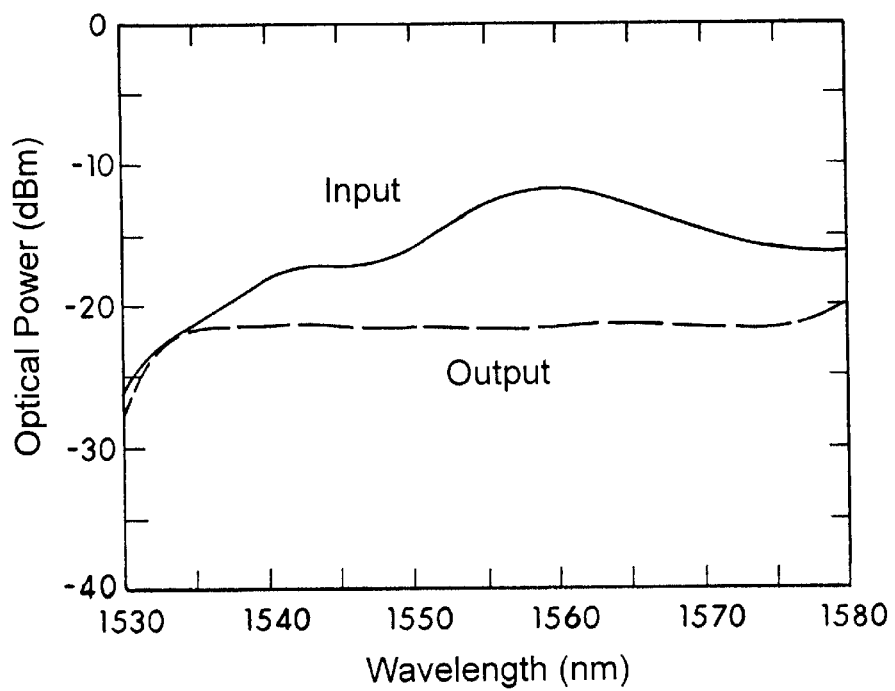
Fig. 12(d)

Fig. 16
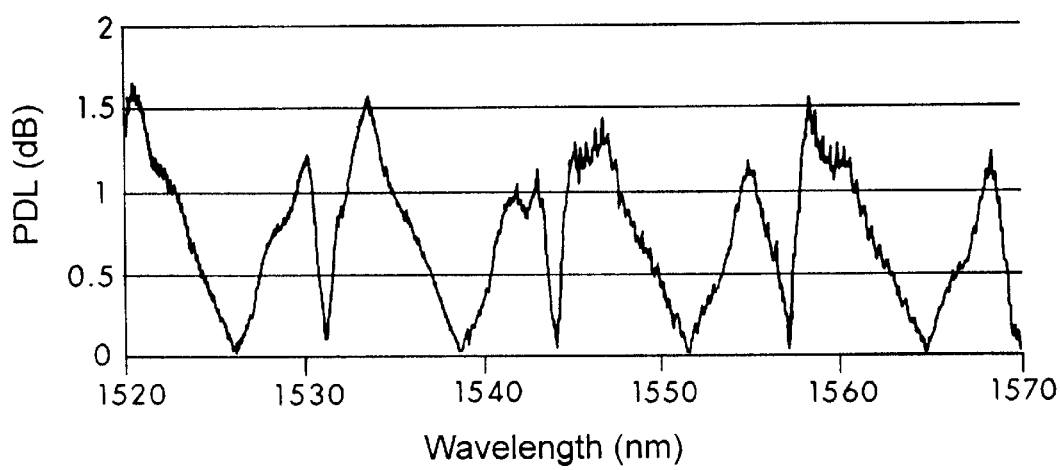
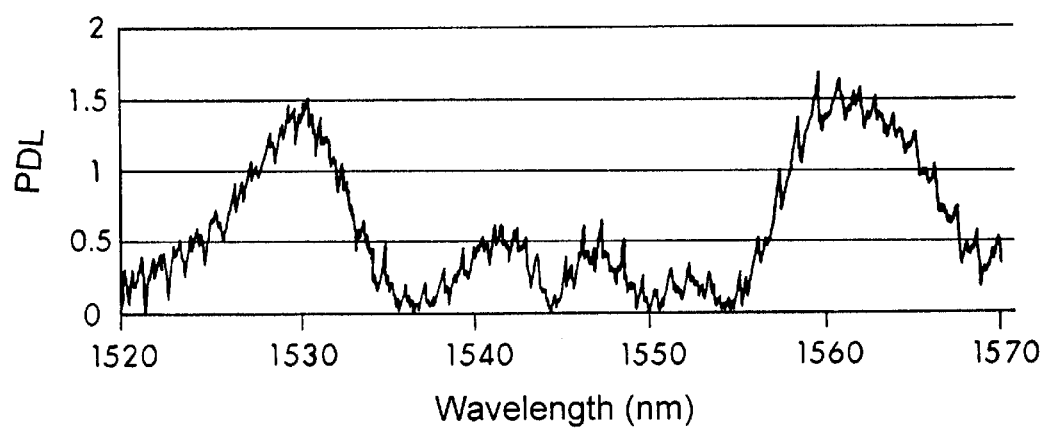
Fig. 17

DYNAMIC GAIN EQUALIZER FOR OPTICAL AMPLIFIERS

BACKGROUND OF THE INVENTION

1. Field of the Invention

The present invention relates generally to the field of equalizers for use in optical communications networks. More specifically, the present invention discloses a dynamic gain equalizer for use primarily with erbium-doped fiber amplifiers.

2. Statement of the Problem

Erbium-doped fiber amplifiers (EDFA) are widely used in optical communication systems. However, their gain spectrum is not flat, which limits their applications in dense wavelength division multiplex (DWDM) systems. To address this problem, some EDFAs use a fixed filter in an attempt to flatten the gain spectrum. For example, a typical commercial EDFA has a gain ripple of approximately 1–3 dB using fixed filters. As shown in FIG. 1, a typical EDFA gain spectrum will shift as a function of its gain setting. While a fixed filter may be effective at a specific operating gain for an EDFA, a fixed filter cannot accommodate changes in the gain spectrum as illustrated in FIG. 1. Future WDM systems will require EDFAs with operating windows of more than 30 nm and gain flatness within 1 dB peak-peak. It is also essential for these high performances to be maintained over a range of operating gains and over the lifetime of the EDFA.

The prior art in this field includes several approaches that have been introduced to implement dynamically adjustable filters. Acousto-optic tunable filters have been used to flatten an EDFA to ±0.7 dB over a 6 dB dynamic range as taught by Hyo Sang Kim et al., "Dynamic Gain Equalization of Erbium-Doped Fiber Amplifier With All-Fiber Acousto-Optic Tunable Filters," OFC '98 Technical Digest, WG4, pp. 136–138. However, acousto-optic tunable filters have the drawbacks of significant polarization sensitivity, intermodulation effects produced by the multiple drive frequencies, and high RF power consumption.

Parry et al., "Dynamic Gain Equalisation of EDFAs with Fourier Filters," Tech. Dig. OAA, 1999, paper ThD 22 (Nortel) have suggested that a set of harmonic sinusoidal filter elements, (e.g., Mach-Zehnder devices) can be cascaded together to build a dynamic gain flattener if each filter can tune center frequencies and attenuation depths, as taught by Betts et al. "Split-Beam Fourier Filter and its Application in a Gain-Flattened EDFA," OFC '95 Technical Digest, TuP4, pp. 80–81.

3. Solution to the Problem

The present invention employs liquid crystal light modulator technology to implement a dynamic gain equalizer consisting of a series of sinusoidal filters. Nothing in the prior teaches or suggests an equalizer using liquid crystal technology to implement a sequence of sinusoidal filters with tunable depth and center wavelength. In contrast to the prior art, the present approach offers the following advantages:

1. Dynamic. The filters are able to flatten the gain profile at different input levels, different temperatures, and different periods in the amplifier's life time.
2. High performance. The present device has low insertion loss, low polarization dependent loss, fast response and low power consumption.
3. Easy to implement. The present design consists of a series of LC cells and crystals. Liquid crystal cells are a mature technology and the requirements for the LC cells are within industrial standards. Crystal polishing and cutting is also a mature technology.
4. Cost effective. All parts in the present design are neither expensive nor difficult to obtain.

SUMMARY OF THE INVENTION

This invention provides an optical equalizer having an initial polarizer that convert the input beam to a predetermined polarization, followed by a series of dynamically-adjustable sinusoidal filters that provide attenuation as a sinusoidal function of beam wavelength. Each of the sinusoidal filters has a first liquid crystal cell adjustably rotating the polarization of the beam from the preceding polarizer. This is followed by a second optical element that retards the beam as a sinusoidal function of beam wavelength. For example, the second optical element can be a birefringent crystal that provided a fixed degree of retardance to the beam and a second liquid crystal cell that provides a variable degree of retardance, thereby allowing adjustment of the center frequency of the sinusoidal function. Finally, a third liquid crystal cell adjustably rotates the polarization of the beam. A final polarizer provides amplitude control of the beam based on the polarization rotations introduced by the first and third liquid crystal cells. A controller provides control signals to the liquid crystal cells of each sinusoidal filter so that their combined sinusoidal attenuation functions produce a desired equalization curve.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 4 is a graph illustrating the relationship between attenuation depth and the voltages applied to the first and third liquid crystal cells, $LC_{i1}$ and $LC_{i3}$, for a typical filter. Attenuation depth increases with voltage.

FIG. 5 is a graph showing the relationship between the center wavelength and voltage on the second liquid crystal cell, $LC_{i2}$, for a typical filter.

FIGS. 12(a) through 12(d) are graphs showing experimental output spectra from the equalizer in FIG. 10 in response to input signals of different power levels, and therefore different spectra shapes.

FIG. 16 is a graph showing the polarization dependent loss of a one-stage equalizer when the amplitude of intensity oscillation is 10 dB.

FIG. 17 is a graph showing the polarization dependent loss of a five-stage equalizer when the input intensity curve is flattened.

DETAILED DESCRIPTION OF THE INVENTION

Figure 1:
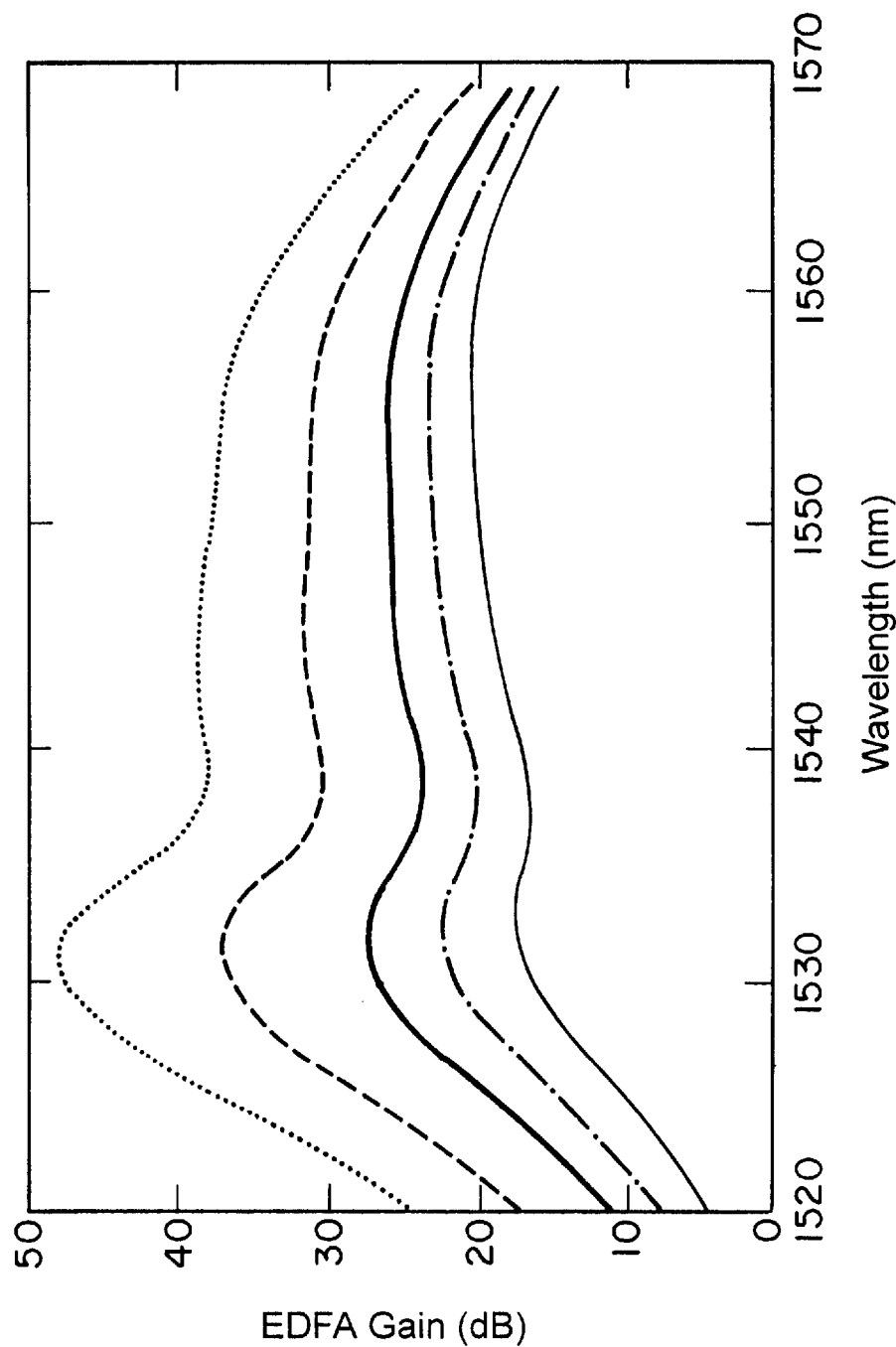
FIG. 1 is a graph showing the gain spectra for a typical EDFA.
Figure 2:
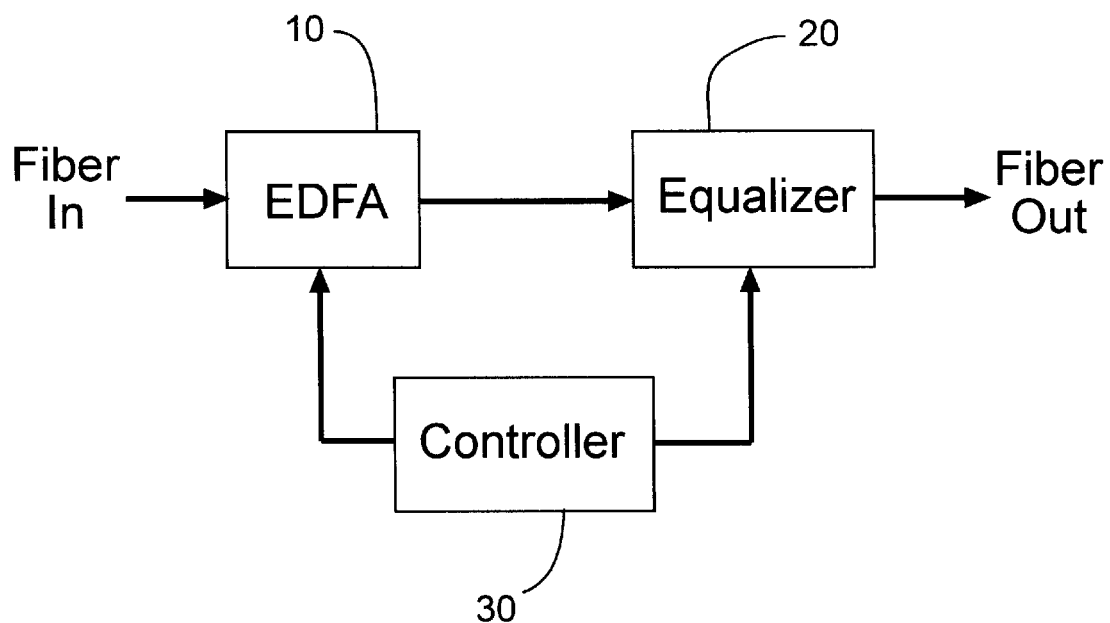
FIG. 2 is a schematic block diagram showing the manner in which the present equalizer 20 is used with an optical amplifier (e.g., an EDFA) 10 to dynamically equalize its gain spectrum.

FIG. 2 is a schematic block diagram showing an optical amplifier 10, such as an EDFA, that amplifies WDM optical signals received from an optical fiber. As previously discussed, the gain spectrum of the EDFA 10 is typically not flat, and also varies as a function of gain setting of the EDFA 10, as previously discussed and illustrated in FIG. 1. The gain setting of the EDFA 10 is determined by a controller 30 (e.g., a microprocessor) to achieve a desired output power level. The present equalizer 20 receives the amplified output signal from the EDFA 10 and dynamically equalizes its gain spectrum based on the EDFA's gain setting supplied by the controller 30. In an optical network, two EDFAs are often chained together, one serves as a low noise pre-amplifier and the other as a power booster. The present equalizer can be placed between these two EDFAs to achieve spectrum flat output.

Figure 3:
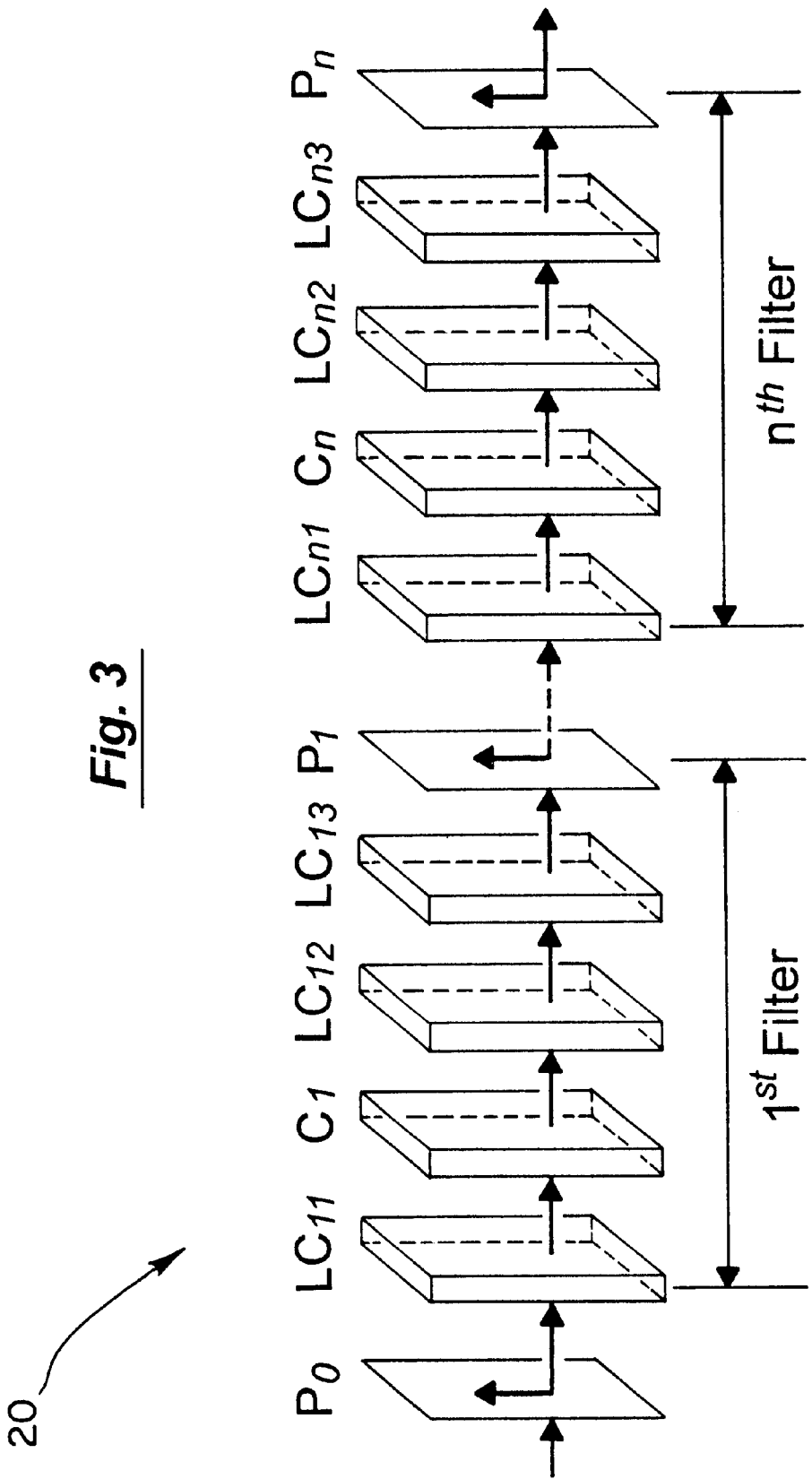
FIG. 3 is a schematic block diagram of the present equalizer 20.

FIG. 3 is a schematic block diagram of the present equalizer 20. The equalizer 20 consists of an initial polarizer $P_0$ (e.g., sheet dichroic or polarizing beamsplitter type) followed by a series of N dynamically-adjustable sinusoidal filters (e.g., N is approximately three to eight, and preferably about five). The initial polarizer $P_0$ converts the input beam to a predetermined polarization (e.g., vertical polarization).

In this embodiment, each sinusoidal filter is comprised of three liquid crystal cells followed by a final polarizer at a predetermined orientation. The first and third liquid crystal cells $LC_{n1}$ and $LC_{n3}$ are used to adjust the sinusoidal amplitude of the $n^{th}$ filter, and $LC_{n2}$ is used to tune the center wavelength of the $n^{th}$ filter. All liquid crystal cells have some twist angle $\phi$, with $\phi$ having a value between $-90°$ to $90°$. Different cells may have different $\phi$ values. If the cell is an ordinary twist nematic LCD, $\phi$ is $90°$. Mixed twist nematic cells having twist angles of $45°$, $30°$, etc. can also be used. If the cell is an anti-parallel or pi-cell LCD, then $\phi$ is $0°$. The alignment conditions for the cells can be homogeneous (i.e., the LC molecules have a pretilt with a few degrees from the substrate surfaces), homeotropic (i.e., the LC molecules have a pretilt within a few degrees from the substrate normal), or tilt alignment (i.e., between homogeneous and homeotropic).

$LC_{n1}$ and $LC_{n3}$ perform the task of amplitude tuning by rotating the polarization of the light—the degree of rotation changes with the voltage applied by the controller 30. The intensity of light passing through the final polarizer $P_n$ will change accordingly. The final polarizer $P_n$ also ensure proper polarization of the beam entering the next filter.

Figure 9:
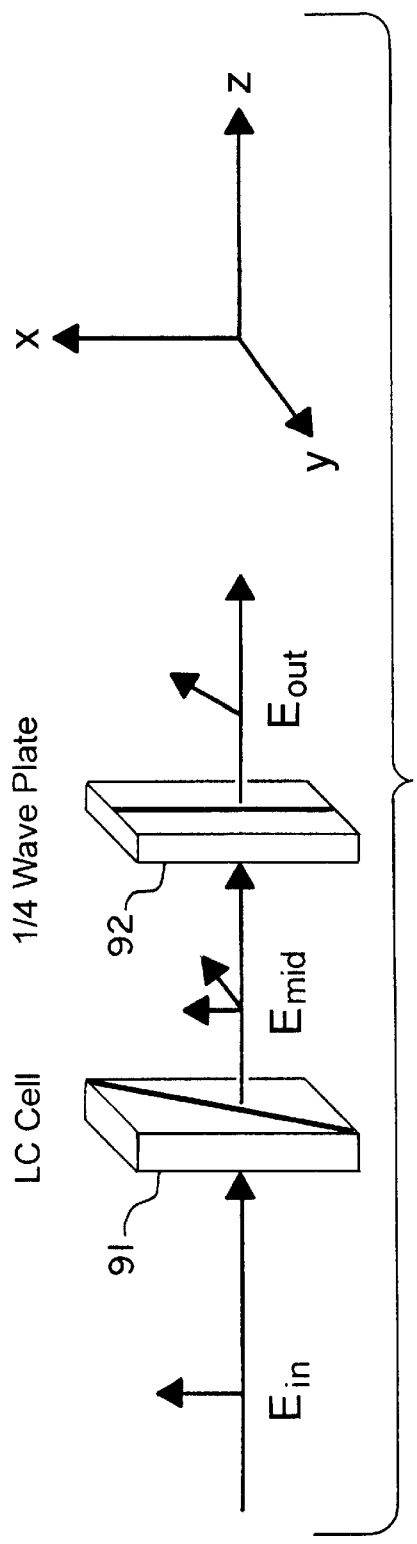
FIG. 9 is a schematic diagram of a polarization rotator consisting of an anti-parallel liquid crystal cell with its optical axis at an angle of 45 degrees to the x-axis and a quarter-wave plate with its optical axis parallel to the x-axis.

To understand how these LC cells work, please consider an embodiment in which the first and third liquid crystal cells, $LC_{n1}$ and $LC_{n3}$, operate in anti-parallel mode. This is perhaps the easiest mode to understand because one anti-parallel LC cell plus a crystal quarter-wave plate form a linear polarization rotator. FIG. 9 is a schematic diagram of a polarization rotator consisting of an anti-parallel liquid crystal cell 91 with its optical axis at an angle of 45 degrees to the x-axis and a quarter-wave plate 92 with its optical axis parallel to the x-axis. By adjusting the voltage on the LC cell 91, the input linear polarization along the x-axis can be rotated to a linear polarization along any direction on the x-y plane.

A theoretical analysis of this polarization rotation is given below. The input polarization is:

$$E_{in} = \begin{pmatrix} E_0 \\ 0 \end{pmatrix}$$

After passing through the LC retarder having birefringence $\Delta n$ and thickness d, in the principal frame of the retarder:

$$E_{mid} = E_{\parallel} e^{i\phi} + E_{\perp}$$

with $$|E_{\parallel}| = |E_{\perp}| = \frac{E_0}{\sqrt{2}}$$

and $$\phi = \frac{2\pi \Delta n d}{\lambda}$$

Back into the lab frame:

$$E_{mid} = \frac{E_0}{2} \begin{pmatrix} e^{i\phi} + 1 \\ e^{i\phi} - 1 \end{pmatrix}$$

On exiting the quarter-wave plate:

$$E_{out} = \frac{E_0}{2} \begin{pmatrix} e^{i\phi} + 1 \\ e^{i\frac{\pi}{2}} e^{i\phi} - e^{i\frac{\pi}{2}} \end{pmatrix} = \frac{E_0}{2} \begin{pmatrix} 1 + \cos\phi + i\sin\phi \\ -\sin\phi - i + i\cos\phi \end{pmatrix}$$

$$= \frac{E_0}{\sqrt{2}} \begin{pmatrix} \sqrt{1+\cos\phi} \; e^{i\tan^{-1}\left(\frac{\sin\phi}{1+\cos\phi}\right)} \\ \sqrt{1-\cos\phi} \; e^{i\tan^{-1}\left(\frac{1-\cos\phi}{\sin\phi}\right)} \end{pmatrix}$$

$$= \frac{E_0}{\sqrt{2}} \begin{pmatrix} \sqrt{1+\cos\phi} \; e^{i\frac{\phi}{2}} \\ \sqrt{1-\cos\phi} \; e^{i\frac{\phi}{2}} \end{pmatrix}$$

$E_{out}$ is linear because its x and y components have the same phase. It makes an angle of $(E_y/E_x)=\phi/2$ to the x-axis. $\phi$ is controlled by the voltage on the LC cell.

Based on this understanding of how each polarization rotator works, it is easier to understand how amplitude modulation is achieved in the embodiment shown in FIG. 3. The input linear polarization is rotated by $LC_{n1}$ and the quarter-wave plate (as part of the center crystal waveplate) so that it makes an angle, $\alpha$, with respect to the crystal axis. When the parameter $\Delta nd$ of the crystal waveplate is an integer number of wavelengths, the polarization remains at the angle $\alpha$ relative to the crystal axis. The combination of a quarter-wave plate (as part of the center crystal waveplate) and $LC_{n3}$ would rotate the polarization back to the x-axis. The relative intensity of the of the transmitted beam equals one after passing through the second polarizer. When the parameter $\Delta nd$ of the crystal waveplate is an integer number of wavelengths plus $\lambda/2$, the polarization rotates to an angle of $-\alpha$ to the optical axis of the crystal. Similarly, a quarter-wave plate and $LC_{n3}$ rotate the polarization to an angle of $-2\alpha$ with respect to the x-axis. The intensity at these wavelengths is $\cos^2(2\alpha)$, which varies with the applied voltage. The intensities at other wavelengths is in between these two extremes.

As previously mentioned, the first and third liquid crystal cells, $LC_{n1}$ and $LC_{n3}$, operate in anti-parallel mode in the preferred embodiment of the present invention. However, twist nematic liquid crystal cells or pi-cell liquid crystal cells could also be employed.

The second liquid crystal cell is employed to tune the center wavelength by controlling the retardation of light as a function of beam wavelength. The effective thickness of the second LC cell, and therefore the degree of retardation, is adjustably controlled by the voltage provided by the controller 30. In this system, the thickness of the second liquid crystal cell is different from stage to stage, depending on required sinusoidal wave's periods (free spectrum range, FSR, obtained from Fourier analysis of the gain profile to be flattened). This might create manufacturing difficulty, particularly since the second liquid crystal cell must have a considerable thickness. To solve this problem, the second liquid crystal can be replaced with a combination of a solid birefringent crystal $C_n$ that provides a fixed degree of retardance, and a liquid crystal cell $LC_{n2}$ that provides a variable degree of retardance, as illustrated in FIG. 3. These solid crystals $C_n$ are designed with different thicknesses for each stages, while $LC_{n2}$ can have the same thickness for each stage, which should be large enough to ensure a full FSR tuning. The solid birefringent crystal $C_n$ typically has a thickness on the order of many hundreds of wavelengths, which greatly reduces the required thickness of the liquid crystal cell $LC_{n2}$ and thereby reduces manufacturing difficulties and cost.

The controller 30 is typically a microprocessor that has been programmed to output control voltages to each of the liquid crystal cells in each sinusoidal filter as a function of the gain of the EDFA 10, so that the combined sinusoidal attenuation functions of the sinusoidal filters produce a desired equalization curve. The appropriate magnitude of the control signal for each LC cell can be derived from a combination of empirical data and Fourier analysis of the output spectra of the EDFA 10 at each gain setting.

The results of a simulation of a gain equalizer 20 with a single-filter are shown in FIGS. 4 and 5. FIG. 4 is a graph illustrating the relationship between attenuation depth and the voltages applied by the controller 30 to the first and third liquid crystal cells, $LC_{n1}$ and $LC_{n3}$, for a typical filter stage. Attenuation depth increases with voltage. FIG. 5 is a graph showing the relationship between the center wavelength and the voltage applied by the controller 30 to the second liquid crystal cell, $LC_{n2}$, for a typical filter stage. In other words, the center wavelength is tunable by varying the voltage on $LC_{n2}$. While tuning the depth, the center wavelength may shift but this is no problem because we can tune the center wavelength easily by controlling the voltage on $LC_{n2}$.

Figure 6:
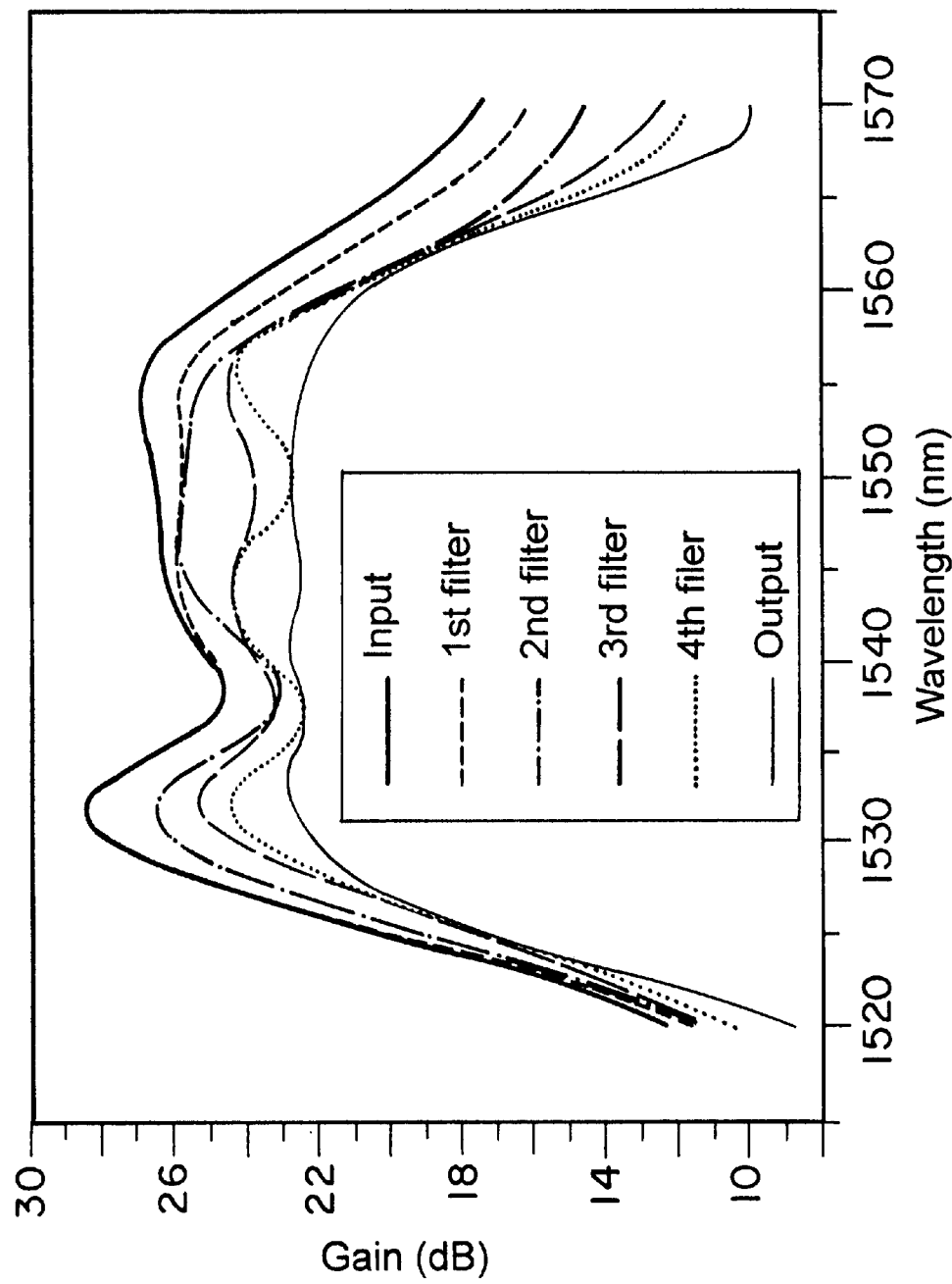
FIG. 6 is a graph showing a typical input gain spectrum from a EDFA and the resulting output spectra for a dynamic equalizer having from one to five cascaded filters.
Figure 7A:
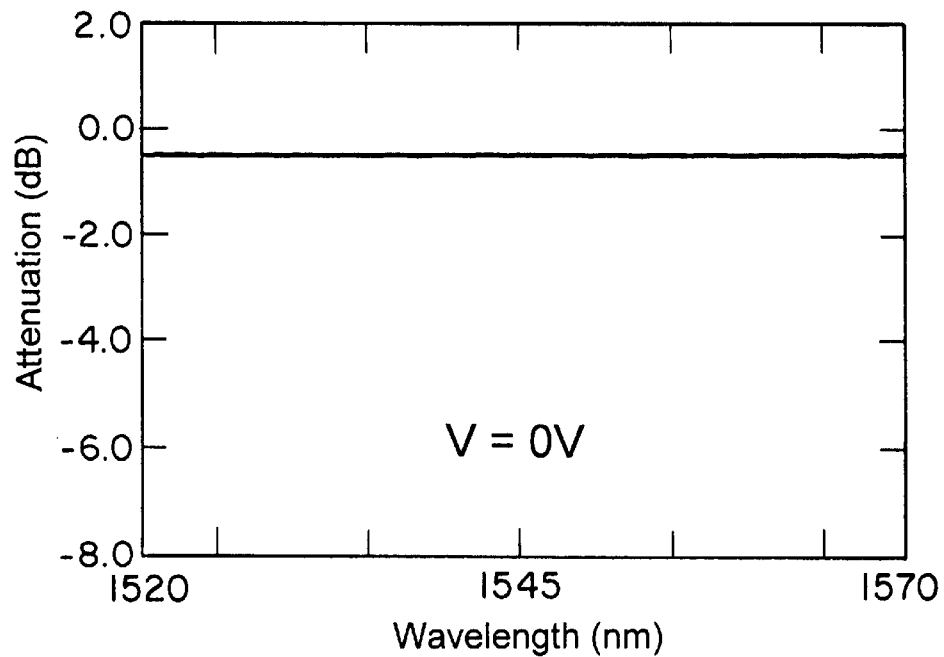
FIGS. 7(a) through 7(d) are graphs of experimental results showing sinusoidal amplitude tuning. Attenuation depth increases with the voltage on the first and third liquid crystal cells, $LC_{i1}$ and $LC_{i3}$.
Figure 7B:
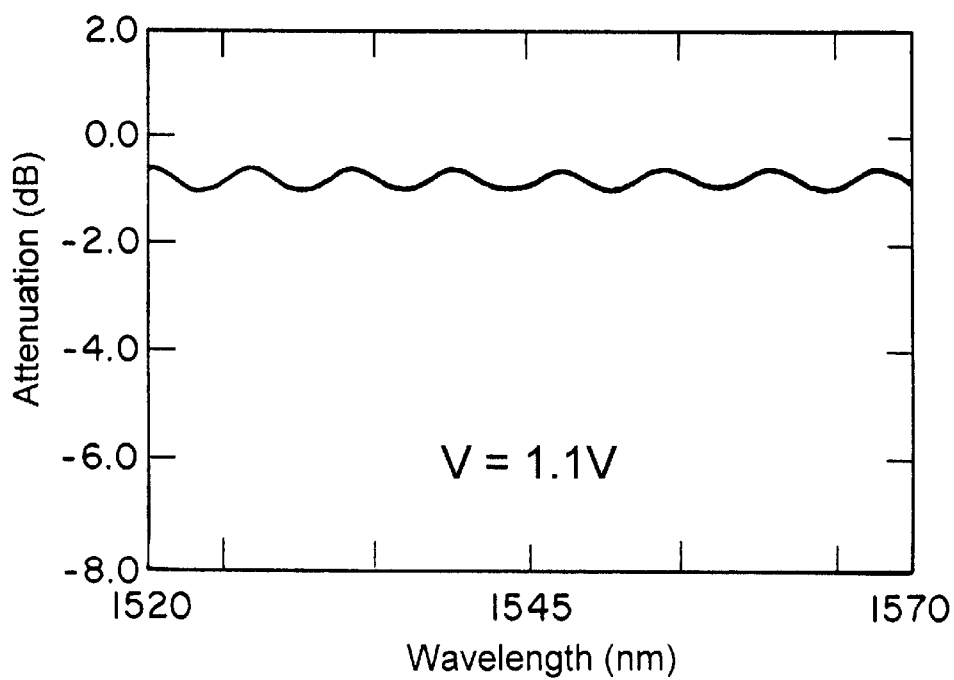
Figure 7C:
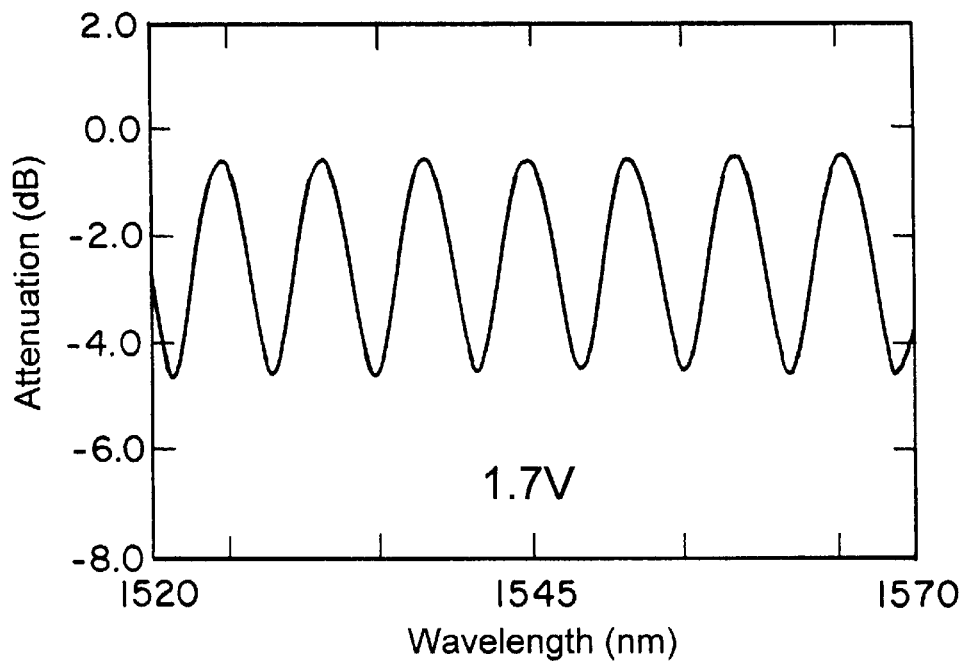
Figure 7D:
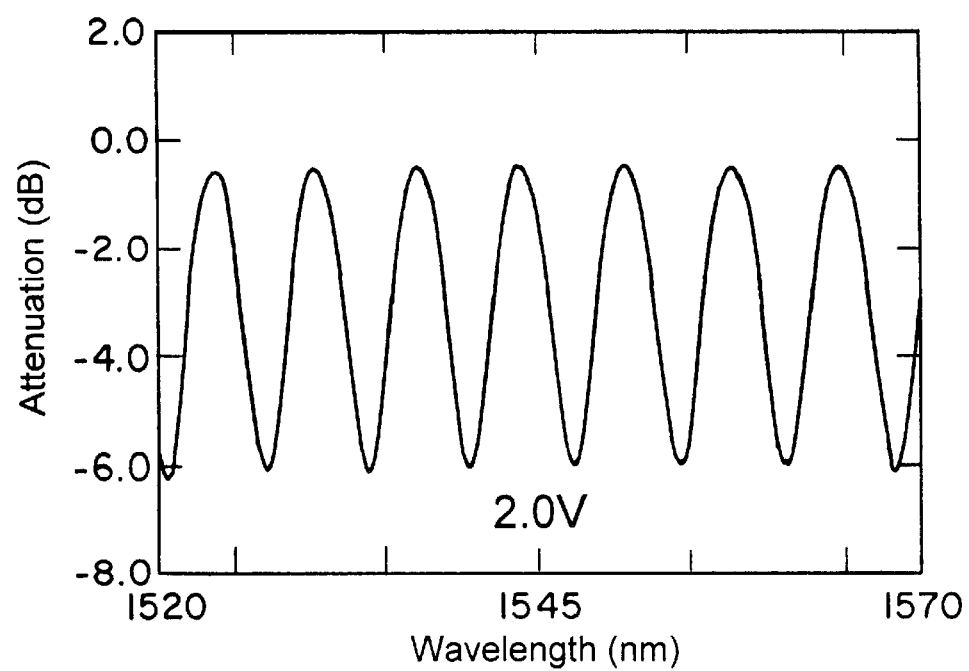
Figure 8B:
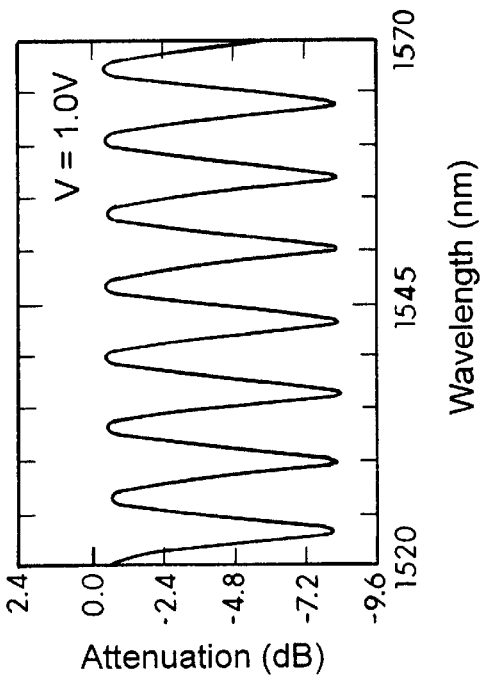
FIGS. 8(a) through 8(d) are graphs of experimental results showing center wavelength tuning by varying the voltage on the second liquid crystal cell, $LC_{i2}$.
Figure 8D:
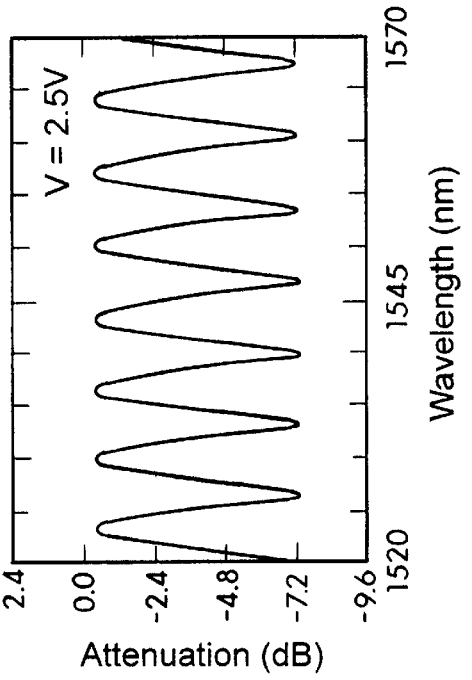
Figure 8A:
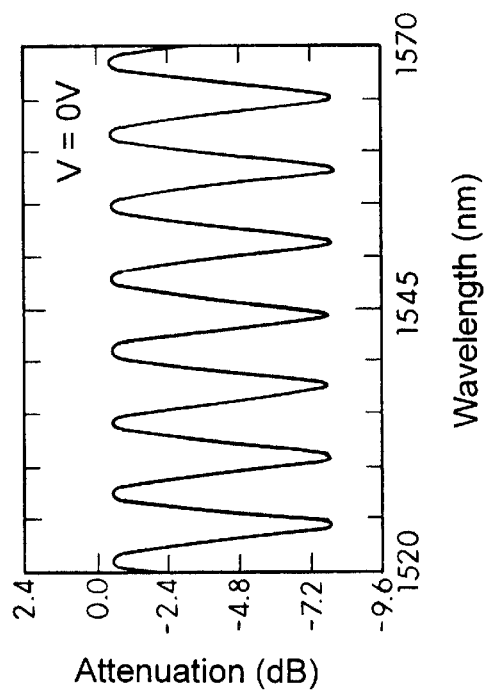
Figure 8C:
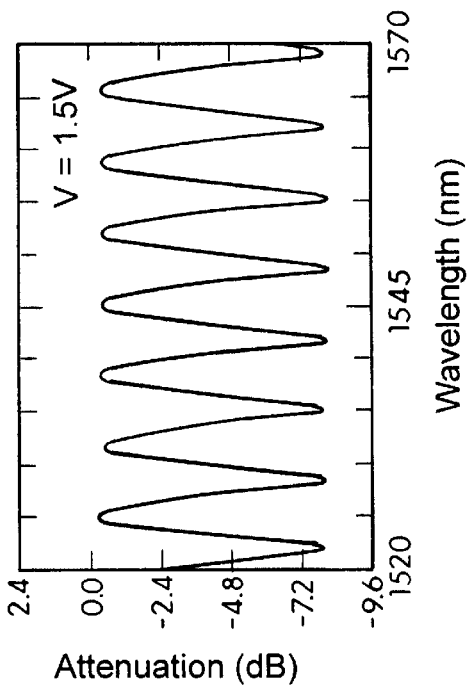

FIG. 6 is a graph showing the simulation result a typical gain spectrum from a EDFA and the resulting output spectra for a dynamic equalizer having from one to five cascaded filters. The gain profile is flattened gradually after passing each filter. It can flatten the gain profile to within 0.4 dB, and with further effort, perhaps to within 0.3 dB.

To verify the simulation, we built a single-filter equalizer using two polarizers, three liquid crystal cells, and a solid crystal wave plate. By varying the control voltage applied to the first and the third liquid crystal cells, $LC_{n1}$, and $LC_{n3}$, we can change filtering amplitude. FIGS. 7(a) through 7(d) are graphs of experimental results showing sinusoidal amplitude tuning. Attenuation depth increases with the voltage applied on the first and third liquid crystal cells, $LC_{n1}$ and $LC_{n3}$ In particular, the amplitude change is about 7 dB when the applied voltage increases from 0 V to 2 V.

FIGS. 8(a) through 8(d) are graphs of experimental results showing center wavelength tuning by varying the voltage on the second liquid crystal cell $LC_{n2}$. These results demonstrate that we can shift the center wavelength over more than one free spectrum range (FSR) and agree very well with the simulation results for one filter.

Figure 10:
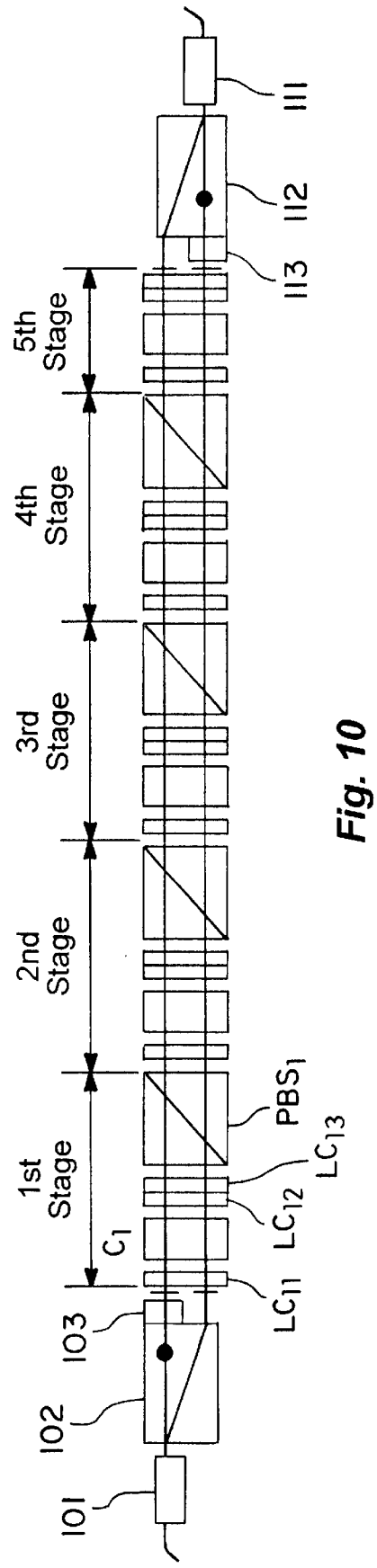
FIG. 10 is a schematic block diagram of a second embodiment of the equalizer.

FIG. 10 is a schematic block diagram of a second embodiment of the equalizer. At the input port 101, the input beam is spatially separated into two orthogonally polarized beams by a birefringent element 102. A polarization rotator 103 rotates the polarization of one of the beams by 90 degrees, so that both beams have the same polarization entering the first stage of the equalizer. Thus, the birefringent element 102 and polarization rotator 103 eliminate the need for the initial polarizer $P_0$ in FIG. 3. In each of the first four stages, the final polarizer ($P_1$ through $P_4$ in FIG. 3) has been replaced by a polarized beamsplitter (PBS) to increase isolation between stages. Light having a first polarization is transmitted by the PBS, but any light having a second, orthogonal polarization is reflected by the PBS. Thus, the PBS can be considered to be a "polarizer" in that it passes only that component of each beam having a desired polarization. In the fifth stage, a polarization rotator 113 rotates the polarization of one of the beams to create an orthogonally-polarized beam pair. A final birefringent element 112 combines this beam pair into a output beam at the output port 111. It should be understood that this combination of polarization rotator 113 and birefringent element 112 also serves as a "polarizer" because only that component of each beam having a desired polarization are routed to the output port 111. Light of any other polarization will follow an optical path through the birefringent element 112 that is not aligned with the output port 111.

Figure 11:
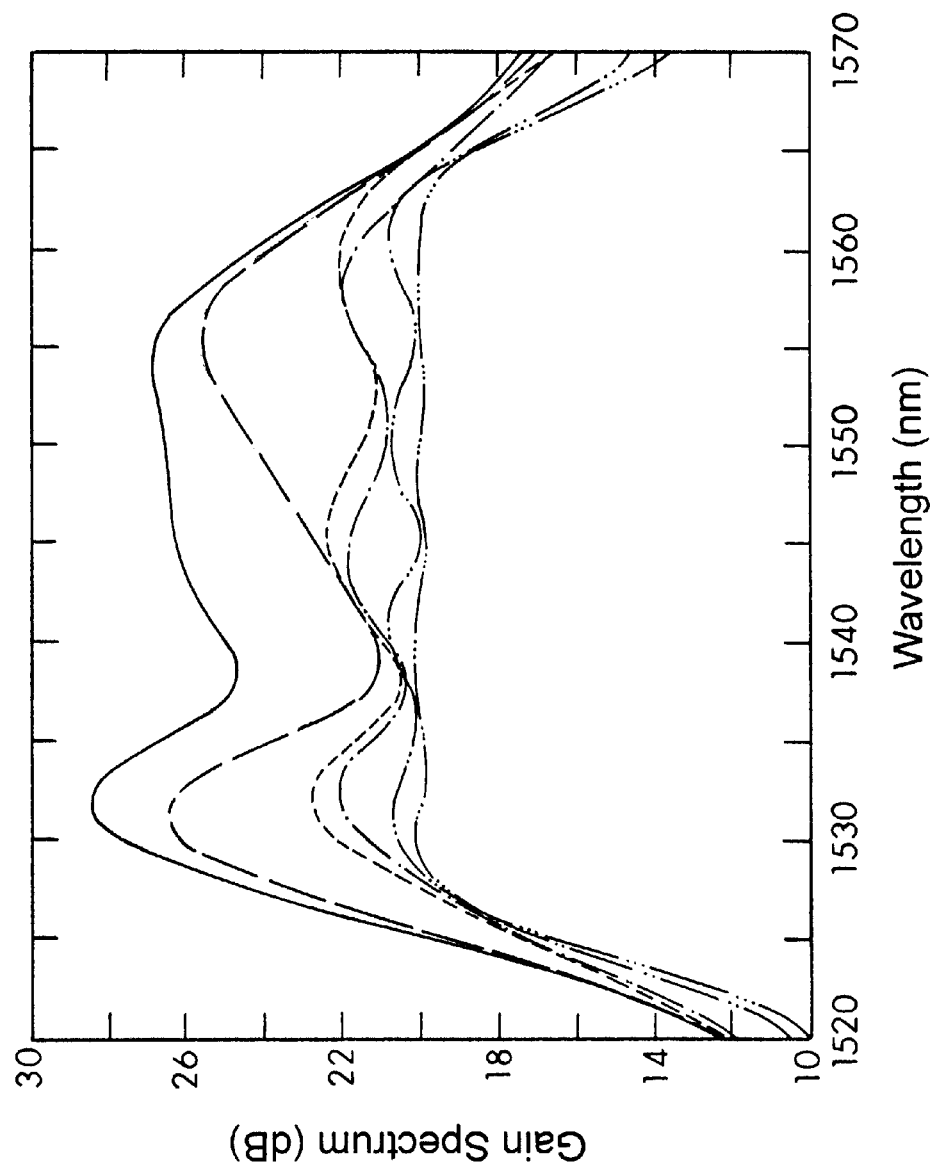
FIG. 11 is a graph similar to FIG. 6 showing a typical input gain spectrum from a EDFA and the resulting output spectra for an equalizer as shown in FIG. 10 after each of the five cascaded filter stages.
Figure 13:
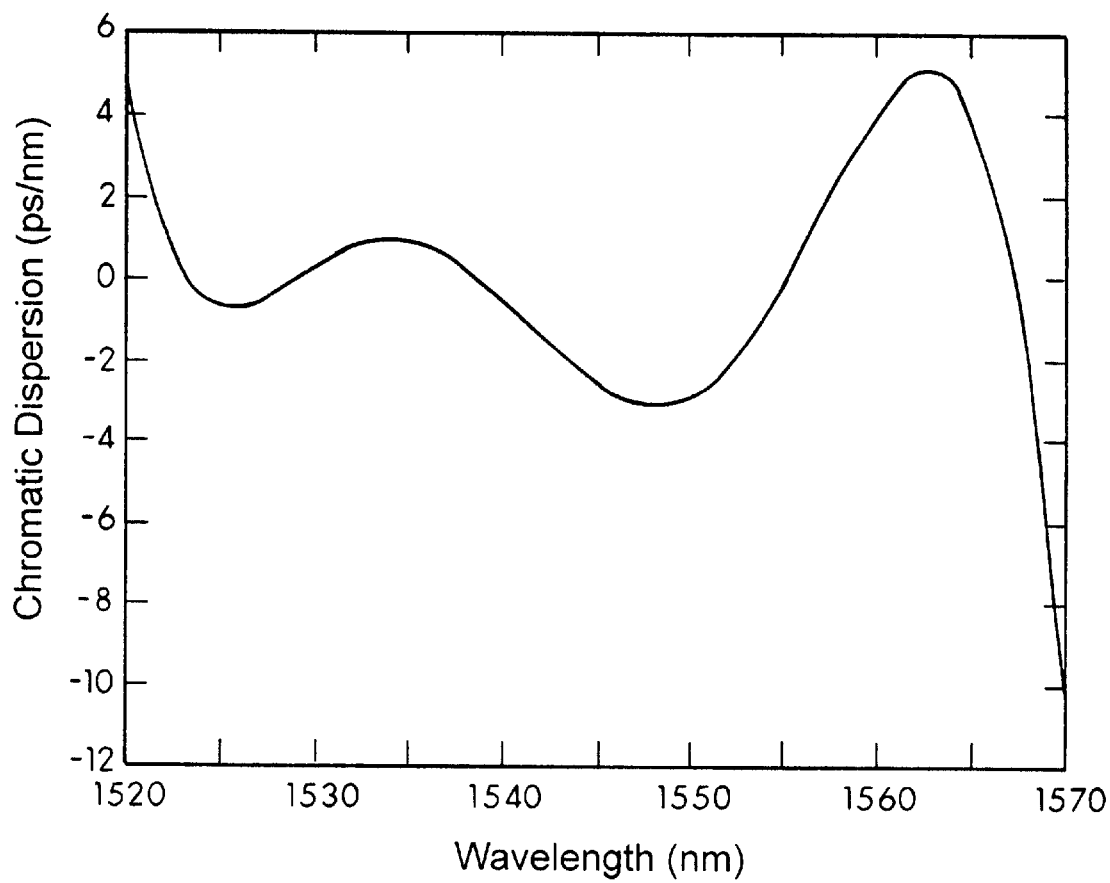
FIG. 13 is a graph showing chromatic dispersion of the equalizer in FIG. 10 as a function of wavelength.

FIG. 11 is a graph similar to FIG. 6 showing a typical input gain spectrum from a EDFA and the resulting output spectra for the equalizer in FIG. 10 after each of the five filter stages. FIGS. 12(a) through 12(d) are graphs showing experimental output spectra from the equalizer in FIG. 10 in response to input signals of different power levels, and therefore different spectra shapes. The equalizer in FIG. 5 is characterized by good performance parameters, such as polarization mode dispersion (PMD) and chromatic dispersion. The average PMD is less than 0.1 picosecond, which is very good. Chromatic dispersion is also small, as shown in the graph provided in FIG. 13.

Figure 14:
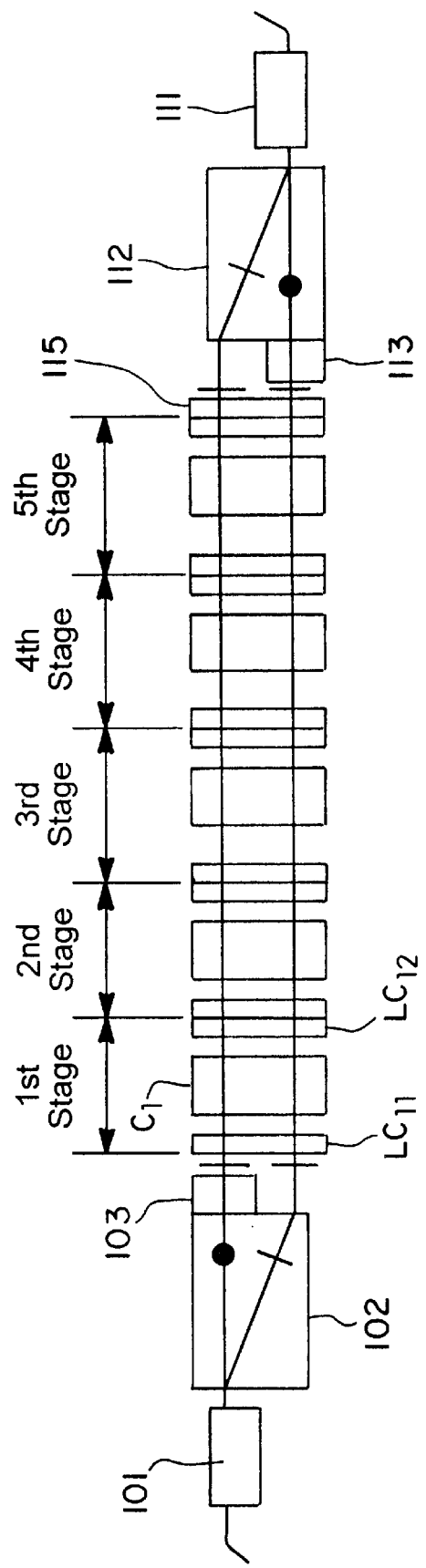
FIG. 14 is a schematic diagram of another embodiment of the equalizer.
Figure 15:
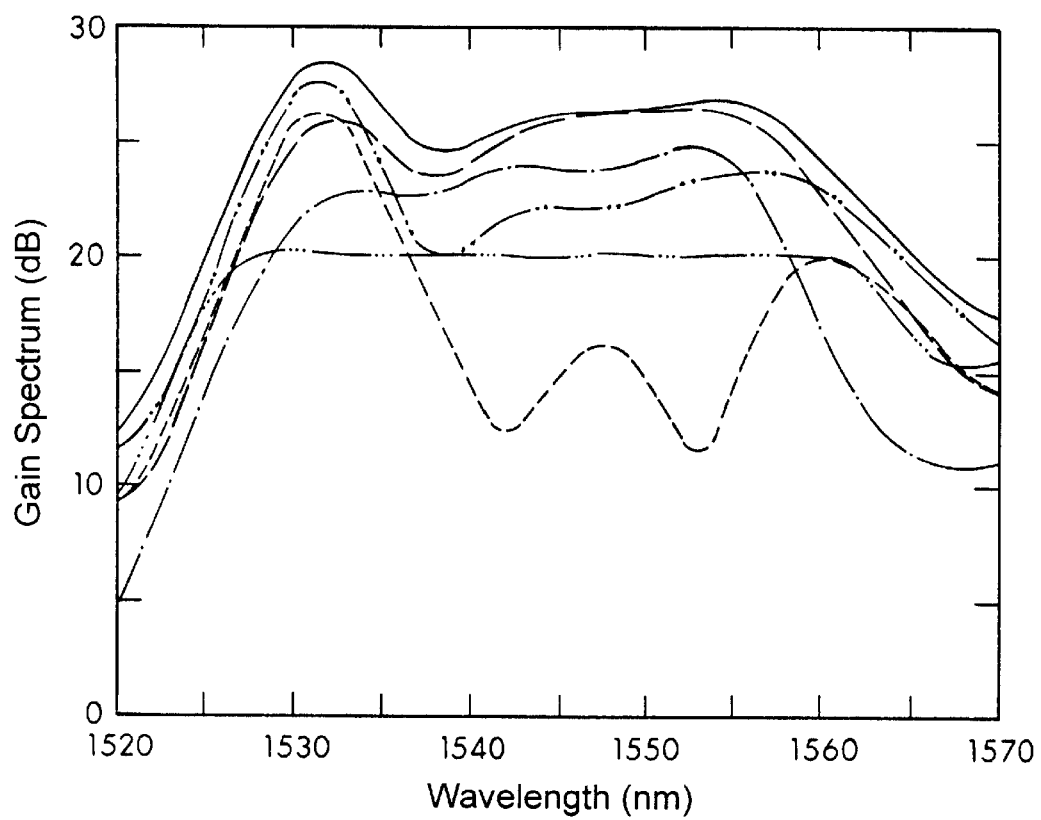
FIG. 15 is a graph showing a typical input gain spectrum from a EDFA and the resulting output spectra for an equalizer as shown in FIG. 14 after each of the filter stages.

FIG. 14 is a schematic diagram of another embodiment of the equalizer in which all of the polarized beamsplitters and the third LC cells have been removed so that the phases of the stages are now coupled together. In other words, the phase of the output beams from the second LC cell is the phase of the input beams to first LC cell in the next stage. This approach has the advantage of requiring fewer components and therefore costing less. It is also smaller in size and has a lower insertion loss. However, this embodiment is more difficult to tune and requires a more complicated control algorithm due to the coupling between stages. FIG. 15 is a graph showing a typical input gain spectrum from a EDFA and the resulting output spectra for an equalizer as shown in FIG. 14 after each of the filter stages.

The embodiments depicted in FIGS. 10 and 14 demonstrate excellent functionality in terms of gain equalization, but may have an undesirably large polarization dependent loss (PDL). PDL is very sensitive to non-uniformity of all of the optical components employed in the device. In the embodiments in FIGS. 10 and 14, the beam pair passes through the optical components in each filter stage with a separation of about 1 mm. If all of the optical components are absolutely uniform, both beams experience the same thicknesses and indices of components, so that PDL is zero. In the real world, PDL may be very large due to non-uniformity of the crystals and liquid crystal cells. FIG. 16 is a graph showing the polarization dependent loss of a one-stage equalizer when the amplitude of intensity oscillation is 10 dB. Similarly, FIG. 17 is a graph showing the polarization dependent loss of a five-stage equalizer when the input intensity curve is flattened. Both graphs show large PDL at certain wavelengths.

Figure 18:
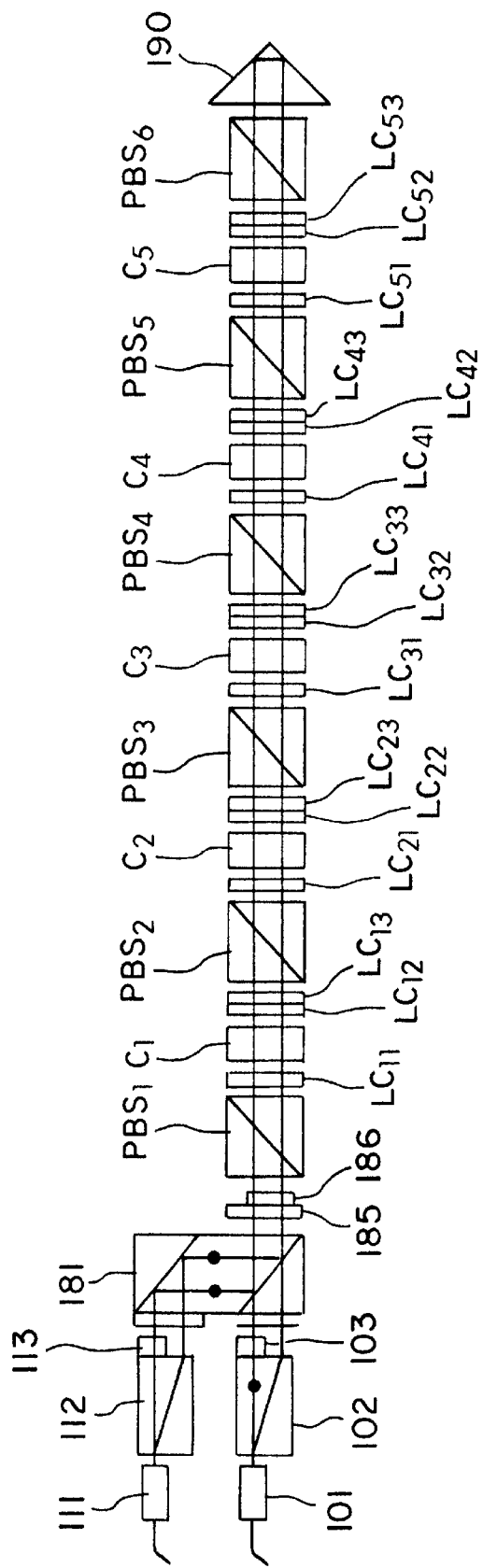
FIG. 18 is a schematic diagram of another embodiment of the equalizer intended to minimize polarization dependent loss.
Figure 19:
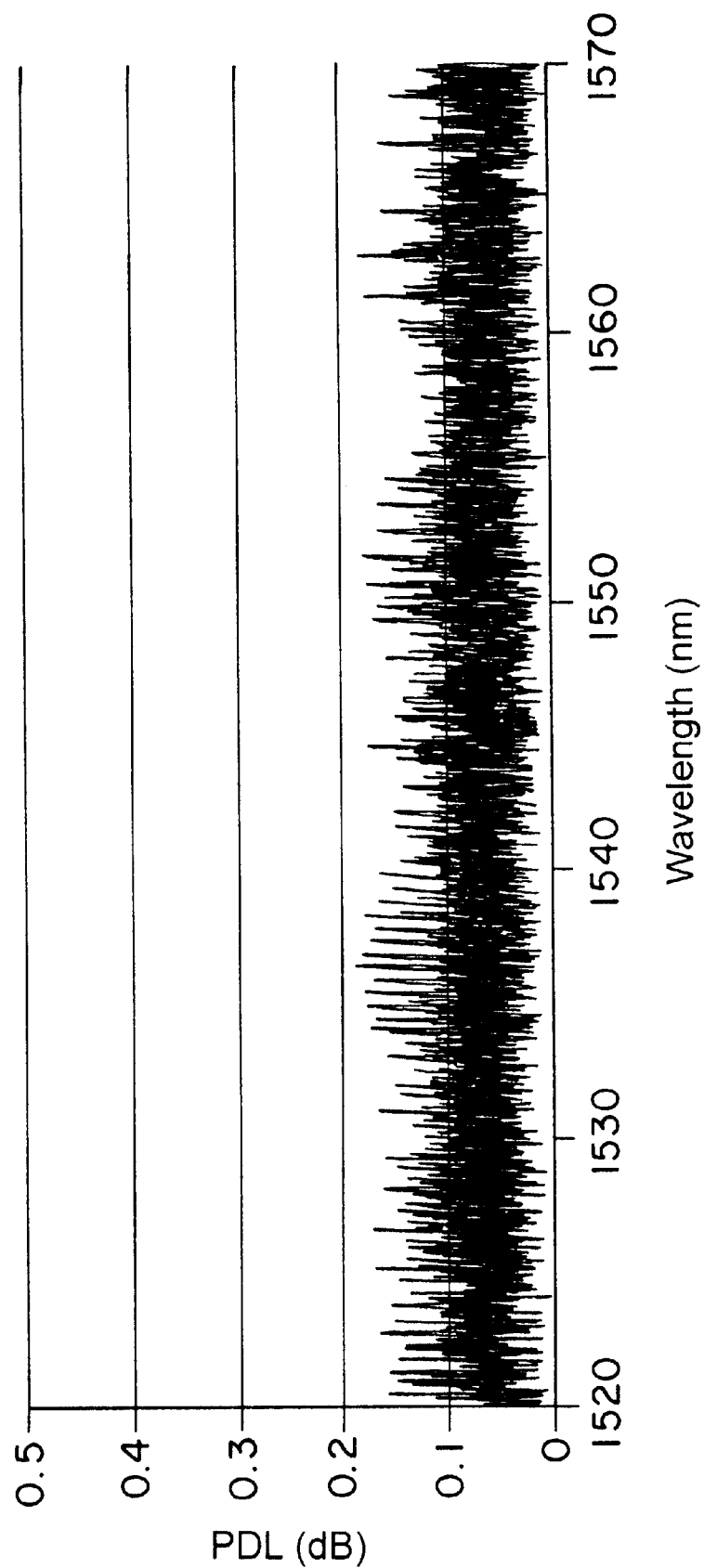
FIG. 19 is a graph showing the polarization dependent loss of a one-stage equalizer using the reflective architecture in FIG. 18 when the intensity oscillation is 10 dB.

FIG. 18 is a schematic diagram of another embodiment of the equalizer intended to minimize polarization dependent loss. Both beams pass through the filter stages twice, but their respective optical paths are exchanged for the second pass. The total optical path for both beams are then substantially identical. This design is essentially insensitive to any non-uniformity of the optical components. FIG. 19 is a graph showing the polarization dependent loss of a one-stage equalizer using the reflective architecture in FIG. 18 when the intensity oscillation is 10 dB. Compared to the embodiment in FIG. 10, the PDL of the reflective scheme in FIG. 18 is much smaller. The insertion loss is, however, larger due to the fact that the optical path length is almost doubled.

Turning to FIG. 18, the beam from the input port 101 is separated by a birefringent element 102 into two orthogonally polarized beams, which are converted to a pair beams having the same polarization by the polarization rotator 103. These beams pass through a Faraday rotator 185 and a half-wave plate 186 without changing polarization. The beams initially pass in the forward direction (i.e., from left to right) through a series of filter stages, as previously discussed. In the specific embodiment illustrated in FIG. 18, each stage consists of a polarized beamsplitter PBSN, three liquid crystal cells $LC_{n1}$, $LC_{n2}$, and $LC_{n3}$, and a birefringent crystal $C_n$, which function as previously described. The beam pair are then reflected by a retro-reflector 190 back through the filter stages in the opposite direction (i.e., from right to left), but with their respective optical paths exchanged. The filter stages are inherently bi-directional. At the end of the return pass, the half-wave plate 186, Faraday rotator 185, and rhomboid prism act as a circulator to spatially separate the reflected beams from the polarized input beams. In particular, the half-wave plate 186 and Faraday rotator 185 rotate the polarization of the reflected beam pair by 90 degrees so that their polarization is orthogonal to that of the polarized input beams propagating in the forward direction. The reflected beam pair are reflected twice within the rhomboid prism 181, routed through a polarization rotator 113, and combined by a birefringent element 112 at the output port 111. It should be noted that a polarized beamsplitter or any other type of polarization-ependent routing element could be used in place of the rhomboid prism 181 to separate the reflected beam pair from the polarized input beams.

The above disclosure sets forth a number of embodiments of the present invention. Other arrangements or embodiments, not precisely set forth, could be practiced under the teachings of the present invention and as set forth in the following claims.

We claim:

1. An optical equalizer comprising:
    an initial polarizer converting an input beam to a predetermined polarization; and
    a plurality of sinusoidal filters receiving the polarized beam in series providing attenuation as a sinusoidal function of beam wavelength, wherein each of said sinusoidal filters comprises:
    (a) a first liquid crystal cell adjustably rotating the polarization of the beam from the preceding polarizer as determined by a first control signal;
    (b) an optical element adjustably controlling the retardance of the beam from said first liquid crystal cell as a sinusoidal function of beam wavelength, wherein the degree of retardation is adjustably controllable by a second control signal, thereby allowing adjustment of the center frequency of the sinusoidal function;
    (c) a second liquid crystal cell adjustably rotating the polarization of the beam from said optical element as determined by a third control signal; and
    (d) a final polarizer passing that component of the beam from the second liquid crystal cell having a predetermined polarization, thereby providing amplitude control of the beam based on the polarization rotations provided by said first and second liquid crystal cells;
    wherein the combined sinusoidal attenuation functions of said sinusoidal filters produce a desired equalization curve as a function of beam wavelength.

2. The optical equalizer of claim 1 wherein said optical element comprises a third liquid crystal cell.

3. The optical equalizer of claim 1 wherein said optical element comprises:
    a third liquid crystal cell providing a variable degree of retardance determined by the second control signal; and
    a birefringent element providing a fixed degree of retardance.

4. The optical equalizer of claim 1 comprising at least three of said sinusoidal filters in series.

5. The optical equalizer of claim 1 comprising at least five of said sinusoidal filters in series.

6. The optical equalizer of claim 1 wherein at least one of said first and second liquid crystal cells comprises a twist nematic liquid crystal cell.

7. The optical equalizer of claim 1 wherein at least one of said first and second liquid crystal cells comprises a mixed twist nematic liquid crystal cell.

8. The optical equalizer of claim 1 wherein at least one of said first and second liquid crystal cells comprises a pi-cell liquid crystal cell.

9. An optical equalizer comprising:
an initial polarizer converting an input beam to a predetermined polarization; and
a plurality of sinusoidal filters receiving the polarized beam in series providing attenuation as a sinusoidal function of beam wavelength, wherein each of said sinusoidal filters has:
(a) a first liquid crystal cell adjustably rotating the polarization of the beam from the preceding polarizer as determined by a control signal;
(b) a birefringent element causing retardation of the beam from the first liquid crystal cell as a sinusoidal function of beam wavelength;
(c) a second liquid crystal cell providing a variable degree of retardance to the beam as determined by a control signal, thereby allowing adjustment of the center frequency of the sinusoidal function;
(d) a third liquid crystal cell adjustably rotating the polarization of the beam from said second liquid crystal cell as determined by a control signal; and
(e) a final polarizer passing that component of the beam from the third liquid crystal cell having a predetermined polarization, thereby providing amplitude control of the beam based on the polarization rotations provided by said first and third liquid crystal cells;
wherein the combined sinusoidal attenuation functions of said sinusoidal filters produce a desired equalization curve as a function of beam wavelength.

10. The optical equalizer of claim 9 comprising at least three of said sinusoidal filters in series.

11. The optical equalizer of claim 9 comprising at least five of said sinusoidal filters in series.

12. The optical equalizer of claim 9 wherein at least one of said liquid crystal cells comprises a twist nematic liquid crystal cell.

13. The optical equalizer of claim 9 wherein at least one of said liquid crystal cells comprises a pi-cell liquid crystal cell.

14. The optical equalizer of claim 9 further comprising a controller providing control signals to said liquid crystal cells of said sinusoidal filters to produce sinusoidal attenuation functions creating a desired equalization function.

15. An optical amplification system comprising:
an optical amplifier having an adjustable gain setting, and a resulting gain spectrum that is a function of both the beam wavelength and said gain setting;
an optical equalizer comprising:
(a) an initial polarizer converting the beam from said optical amplifier to a predetermined polarization; and
(b) a plurality of sinusoidal filters receiving the polarized beam in series providing attenuation as a sinusoidal function of beam wavelength, wherein each of said sinusoidal filters has:
(i) a first liquid crystal cell adjustably rotating the polarization of the beam from the preceding polarizer as determined by a first control signal;
(ii) an optical element adjustably controlling the retardance of the beam from said first liquid crystal cell as a sinusoidal function of beam wavelength, wherein the degree of retardation is adjustably controllable by a second control signal, thereby allowing adjustment of the center frequency of the sinusoidal function;
(iii) a second liquid crystal cell adjustably rotating the polarization of the beam from said optical element as determined by a third control signal; and
(iv) a final polarizer passing that component of the beam from the second liquid crystal cell having a predetermined polarization, thereby providing amplitude control of the beam based on the polarization rotations provided by said first and second liquid crystal cells; and
a controller providing the first and third control signals to said liquid crystal cells of said sinusoidal filters to produce sinusoidal attenuation functions creating an equalization function determined by the gain setting of said optical amplifier.

16. The optical equalizer of claim 15 comprising at least three of said sinusoidal filters in series.

17. The optical equalizer of claim 15 comprising at least five of said sinusoidal filters in series.

18. The optical equalizer of claim 15 wherein at least one of said first and second liquid crystal cells comprises a twist nematic liquid crystal cell.

19. The optical equalizer of claim 15 wherein at least one of said first and second liquid crystal cells comprises a pi-cell liquid crystal cell.

20. An optical equalizer comprising:
an initial polarizer converting an input beam to a predetermined polarization; and
a plurality of sinusoidal filters receiving the polarized beam in series providing attenuation as a sinusoidal function of beam wavelength, wherein each of said sinusoidal filters has:
(a) a first liquid crystal cell adjustably rotating the polarization of the input beam to the filter as determined by a control signal;
(b) a birefringent element introducing retardance of the beam from said first liquid crystal cell as a sinusoidal function of beam wavelength; and
(c) a second liquid crystal cell adjustably controlling the retardance of the beam from the birefringent element, wherein the degree of retardation is adjustably controllable by a control signal, thereby allowing adjustment of the center frequency of the sinusoidal function;
wherein the combined sinusoidal attenuation functions of said sinusoidal filters produce a desired equalization curve as a function of beam wavelength.

21. The optical equalizer of claim 20 comprising at least three of said sinusoidal filters in series.

22. The optical equalizer of claim 20 comprising at least five of said sinusoidal filters in series.

23. The optical equalizer of claim 20 wherein at least one of said liquid crystal cells comprises a twist nematic liquid crystal cell.

24. The optical equalizer of claim 20 wherein at least one of said liquid crystal cells comprises a pi-cell liquid crystal cell.

25. An optical equalizer comprising:
a first birefringent element spatially separating an input beam into a pair of orthogonally-polarized beams;
a first polarization rotator rotating the polarization of at least one of the orthogonally-polarized beams so that both beams have substantially the same polarization;

a circulator transmitting the polarized beams in a forward direction, but routing light from the opposite direction in a second direction;

a series of sinusoidal filters, each sinusoidal filter transmitting the polarized beams from the circulator along parallel optical paths and providing attenuation as a sinusoidal function of beam wavelength so that the combined sinusoidal attenuation functions of the sinusoidal filters produce a desired equalization curve as a function of beam wavelength, wherein each of said sinusoidal filters comprises:
- (a) a first liquid crystal cell adjustably rotating the polarization of the beams from the preceding polarizer as determined by a first control signal;
- (b) an optical element adjustably controlling the retardance of the beams from said first liquid crystal cell as a sinusoidal function of beam wavelength, wherein the degree of retardation is adjustably controllable by a second control signal, thereby allowing adjustment of the center frequency of the sinusoidal function;
- (c) a second liquid crystal cell adjustably rotating the polarization of the beams from said second optical element as determined by a third control signal; and
- (d) a final polarizer passing those components of the beams from the second liquid crystal cell having a predetermined polarization, thereby providing amplitude control of the beams based on the polarization rotations provided by said first and second liquid crystal cells;

a retro-reflector reflecting the beams exiting the sinusoidal filters back through the sinusoidal filters, but with their optical paths exchanged;

wherein the circulator spatially separates the reflected beams exiting the sinusoidal filters from the polarized input beams and routes the reflected beams in the second direction;

a final polarization rotator rotating the polarization of at least one of the reflected beams from the circulator to produce a pair of orthogonally-polarized beams; and a final birefringent element combining the orthogonally-polarized beams from the final polarization rotator to produce an output beam.

26. The optical equalizer of claim 25 wherein the circulator comprises a half-wave plate, Faraday rotator, and polarization-dependent routing element.

27. The optical equalizer of claim 25 wherein the optical element comprises:

a third liquid crystal cell providing a variable degree of retardance determined by the second control signal; and a birefringent element providing a fixed degree of retardance.

* * * * *